(12) United States Patent
Fish

(10) Patent No.: US 7,540,157 B2
(45) Date of Patent: Jun. 2, 2009

(54) INTERNALLY MOUNTED FUEL MANIFOLD WITH SUPPORT PINS

(75) Inventor: Jason Araan Fish, Brompton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 632 days.

(21) Appl. No.: 11/151,644

(22) Filed: Jun. 14, 2005

(65) Prior Publication Data

US 2006/0277913 A1 Dec. 14, 2006

(51) Int. Cl.
*F02C 7/20* (2006.01)
*B23P 21/00* (2006.01)

(52) U.S. Cl. .......................... 60/798; 29/469

(58) Field of Classification Search .......... 60/739, 60/798, 796, 799; 29/888, 889.22, 889.21, 29/469
See application file for complete search history.

(56) References Cited

U.S. PATENT DOCUMENTS

| | | | |
|---|---|---|---|
| 1,081,950 A | | 12/1913 | Eller |
| 2,151,540 A | | 3/1939 | Varga |
| 2,443,373 A | | 6/1948 | Borsoff |
| 2,548,904 A | | 4/1951 | Neal et al. |
| 2,690,648 A | | 10/1954 | Pearce et al. |
| 2,946,185 A | | 7/1960 | Bayer |
| 2,970,438 A | | 2/1961 | Howald |
| 2,993,338 A | | 7/1961 | Wllsted |
| 3,027,715 A | * | 4/1962 | Morris ................. 60/796 |
| 3,147,594 A | | 9/1964 | Hill et al. |
| 3,159,971 A | | 12/1964 | Moebius et al. |
| 3,213,523 A | | 10/1965 | Boehler |
| 3,335,567 A | | 8/1967 | Hemsworth |
| 3,472,025 A | | 10/1969 | Simmons et al. |
| 3,518,252 A | | 6/1970 | Udell et al. |
| 3,768,251 A | | 10/1973 | Camboulives et al. |
| 3,879,940 A | | 4/1975 | Stenger et al. |
| 4,028,888 A | | 6/1977 | Pilarczyk |
| 4,100,733 A | | 7/1978 | Striebel et al. |
| 4,185,462 A | | 1/1980 | Morse, II et al. |
| 4,216,651 A | | 8/1980 | Ormerod |
| 4,322,945 A | | 4/1982 | Peterson et al. |
| 4,332,626 A | | 6/1982 | Hood et al. |
| 4,377,420 A | | 3/1983 | Granatek et al. |
| 4,404,806 A | | 9/1983 | Bell, III et al. |
| 4,441,323 A | | 4/1984 | Colley |
| 4,466,240 A | | 8/1984 | Miller |
| 4,467,610 A | | 8/1984 | Pearson et al. |
| 4,708,371 A | | 11/1987 | Elsworth et al. |
| 5,031,407 A | | 7/1991 | Zaremba et al. |
| 5,036,657 A | | 8/1991 | Seto et al. |

(Continued)

FOREIGN PATENT DOCUMENTS

CA 1013153 7/1977

(Continued)

*Primary Examiner*—Michael Cuff
*Assistant Examiner*—Gerald L Sung
(74) *Attorney, Agent, or Firm*—Ogilvy Renault LLP

(57) ABSTRACT

A method and apparatus for internally mounting a fuel manifold within a surrounding casing in a gas turbine engine which involves inserting the fuel manifold into the casing with support elements positioned in a retracted position, displacing the support elements into an extended position, and fastening said support elements to mount the manifold to an inner surface of said casing.

10 Claims, 3 Drawing Sheets

U.S. PATENT DOCUMENTS

| | | | |
|---|---|---|---|
| 5,076,242 A | 12/1991 | Parker | |
| 5,197,288 A | 3/1993 | Newland et al. | |
| 5,253,471 A | 10/1993 | Richardson | |
| 5,259,185 A | 11/1993 | Peterson | |
| 5,261,240 A | 11/1993 | Oyler et al. | |
| 5,263,314 A | 11/1993 | Anderson | |
| 5,271,219 A | 12/1993 | Richardson | |
| 5,279,112 A | 1/1994 | Halila | |
| 5,305,609 A | 4/1994 | Guinan et al. | |
| 5,328,101 A | 7/1994 | Munshi | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,439,189 A * | 8/1995 | Wiley et al. | 244/54 |
| 5,570,580 A | 11/1996 | Mains | |
| 5,579,645 A | 12/1996 | Prociw et al. | |
| 5,598,696 A | 2/1997 | Stotts | |
| 5,771,696 A | 6/1998 | Hansel et al. | |
| 5,848,525 A | 12/1998 | Spencer | |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,354,085 B1 | 3/2002 | Howell et al. | |
| 6,463,739 B1 | 10/2002 | Mueller et al. | |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 2003/0014979 A1 | 1/2003 | Summerfield et al. | |
| 2005/0039457 A1 | 2/2005 | Moraes | |

FOREIGN PATENT DOCUMENTS

| | | |
|---|---|---|
| CA | 2307185 | 5/1999 |
| CA | 2506208 | 11/2005 |
| EP | 1 609 954 | 12/2005 |

* cited by examiner

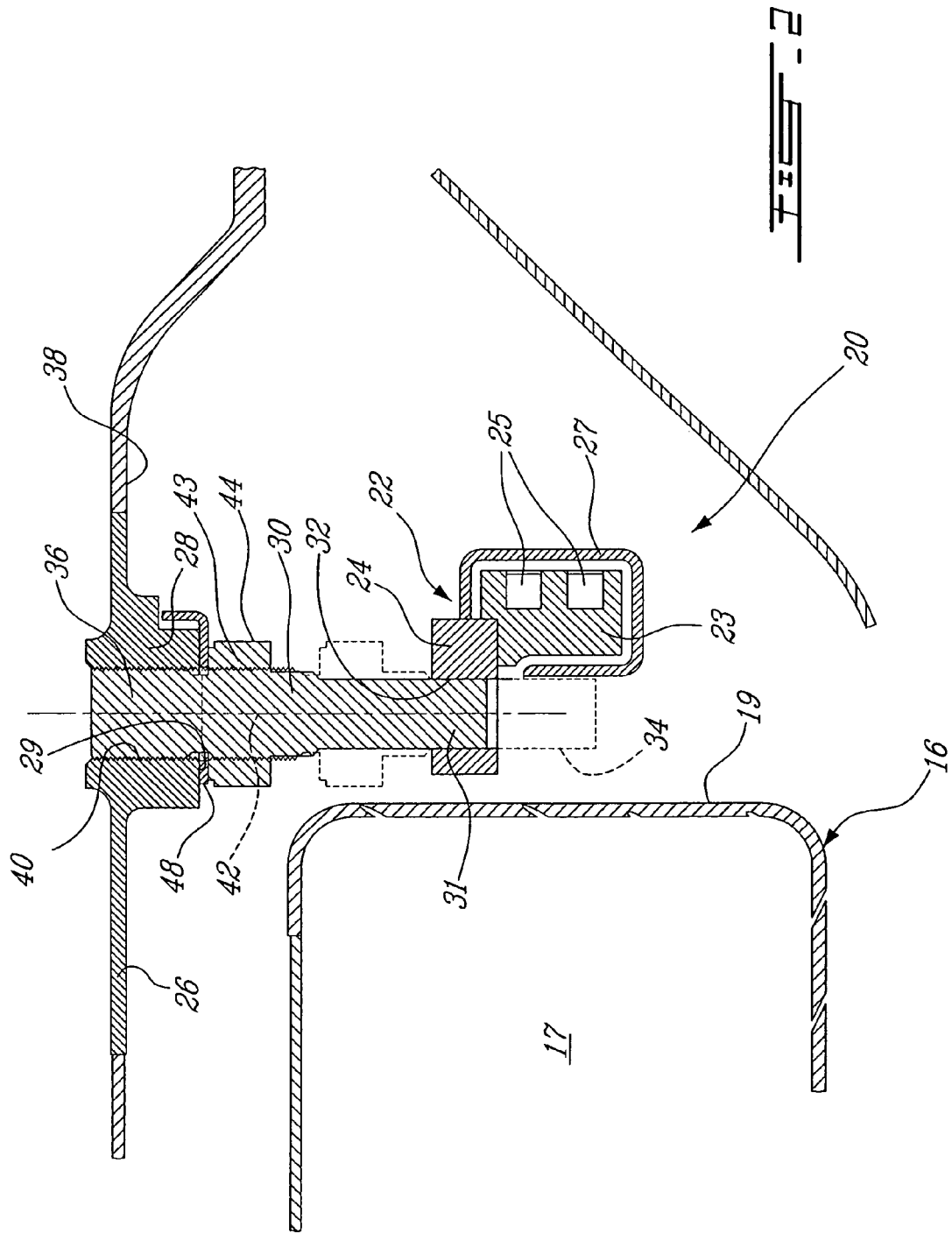

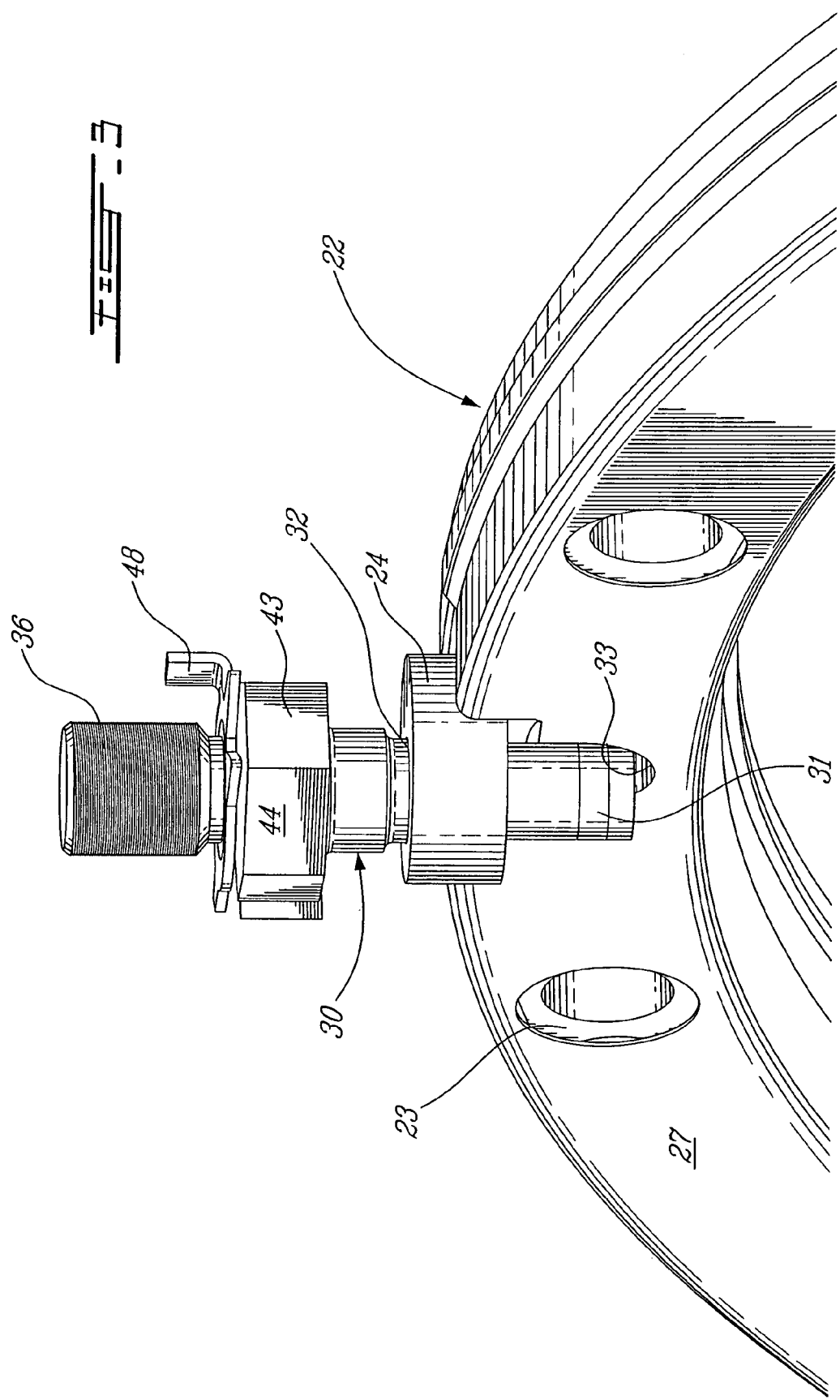

 
INTERNALLY MOUNTED FUEL MANIFOLD WITH SUPPORT PINS

TECHNICAL FIELD

The invention relates generally to fuel manifolds for gas turbine engines and, more particularly, to an improved structure and method for mounting fuel manifolds.

BACKGROUND OF THE ART

Annular fuel manifolds which distribute fuel to a plurality of fuel nozzles for injection into the combustion chamber of a gas turbine engine are typically supported within the surrounding structure of the engine by several radially extending support pins which are externally mounted and inserted through the engine casing for engagement with the fuel manifold. As such, the circumferentially spaced pins support the annular fuel manifold within the surrounding casing such that the fuel manifold is located in place adjacent a dome end of the combustor while nevertheless permitting sufficient displacement to accommodate any thermal growth mismatch between the fuel manifold and the supporting casing.

However such support pins are assembled from the outside of the engine casing and therefore assembly and installation of the pins to mount the fuel manifold in place can be time consuming and problematic due to obstruction by other engine components which surround the combustion section of the gas turbine engine. Removal and re-installation of the fuel manifold for inspection and/or maintenance purposes thus also becomes problematic.

Accordingly, there is a need to provide an improved method and structure to assemble and mount a fuel manifold using support pins.

SUMMARY OF THE INVENTION

It is therefore an object of this invention to provide an improved structure and method for mounting fuel manifolds.

In one aspect, the present invention provides a method of installing a fuel manifold within a casing of a gas turbine engine comprising: providing the fuel manifold with attachment members fixed thereto, each of said attachment members defining an aperture for receiving a support element therein; mounting said support elements on said fuel manifold in a retracted position within said apertures such that said support elements project a first distance from said fuel manifold, said fuel manifold and said support elements mounted thereto in said retracted position forming a sub-assembly sized for receipt within said casing; inserting said sub-assembly into said casing; displacing said support elements outwards from retracted position into an extended position wherein the support elements project from the fuel manifold as second distance greater than said first distance, outer ends of said support elements being disposed proximate an inner surface of said surrounding casing when said support elements are disposed in said extended position; and fastening said outer ends of said support elements to said inner surface of said casing.

In another aspect, the present invention provides a method of internally mounting a fuel manifold within a surrounding casing in a gas turbine engine, the gas turbine engine including support elements mounted to at least one of the fuel manifold and the surrounding casing and movable relative thereto between at least a retracted and an extended position while mounted thereto, the method comprising: placing the support elements mounted in a retracted position; inserting the fuel manifold into the casing; and moving said support elements to the extended position to supportingly engage said fuel manifold to said casing.

In yet another aspect, the present invention provides a fuel manifold assembly for internal mounting within a surrounding casing of a gas turbine engine, comprising: an annular fuel manifold having mounting portions spaced about the circumference thereof; support pins engageable with said mounting portions and displaceable relative thereto between a retracted position, permitting said fuel manifold and said support pins to be inserted within the casing, and an extended position, in which said support pins project outwardly from said fuel manifold for engagement with said casing; and wherein said support pins are displaceable from said retracted position to said extended position once inserted into said casing for fastening to an inner surface thereof.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a partial schematic cross-sectional view of an annular fuel manifold internally mounted within the gas generator case by support pin assemblies according to the present invention; and FIG. 3 is a perspective view of the annular fuel manifold and a support pin assembly of FIG. 2.

DETAILED DESCRIPTION OF THE PREFERRED EMBODIMENTS

Figure 1:
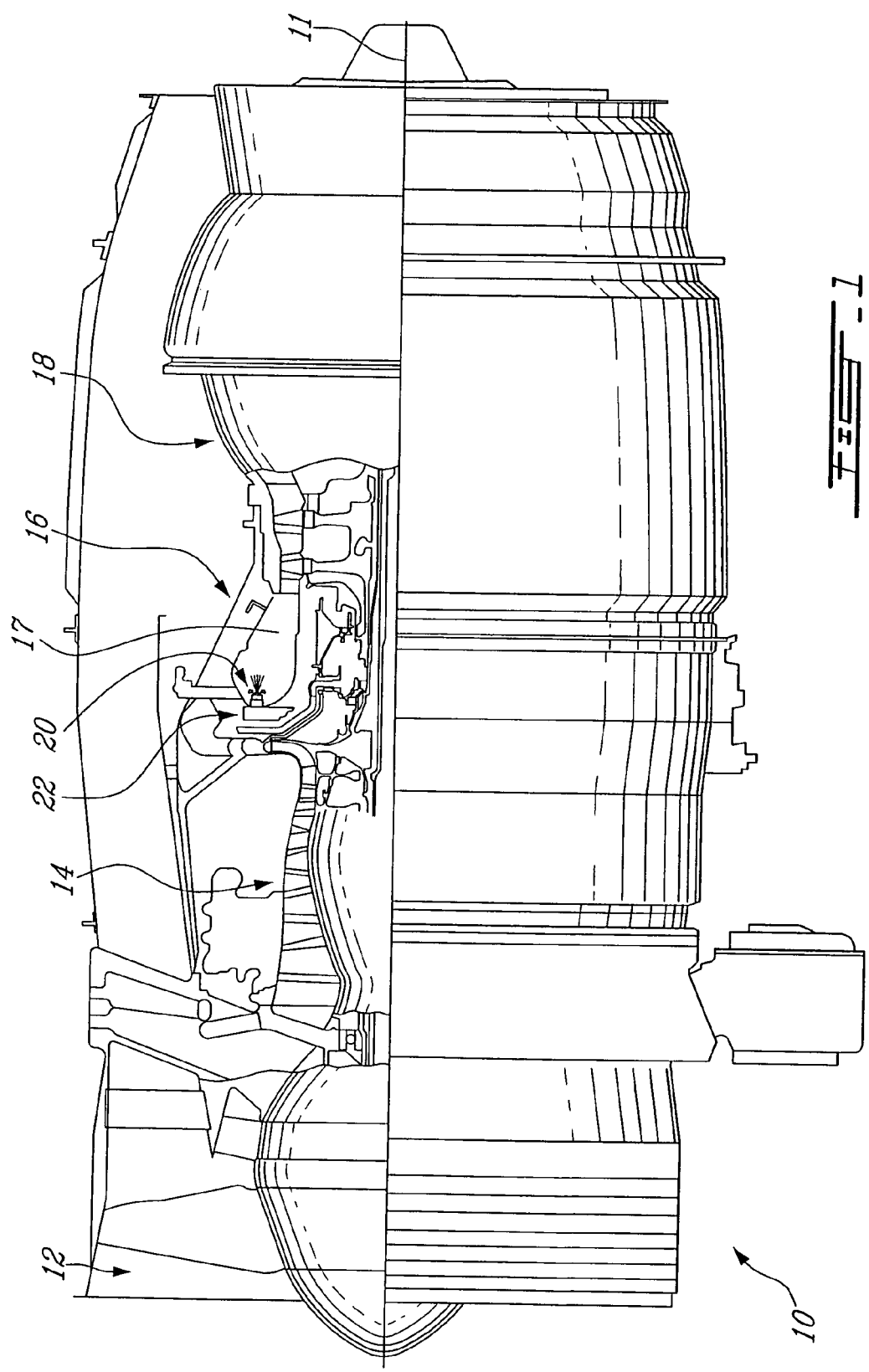
FIG. 1 is a partial cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 defining a combustion chamber 17 within which the compressed air is mixed with fuel and ignited for generating an annular stream of hot combustion gases, and a turbine section 18 for extracting energy from the combustion gases.

Fuel is injected into the combustor 16 using a fuel injection system 20, which comprises a fuel manifold ring 22 disposed outside the combustor 16 and n internally mounted within the surrounding engine casing.

Referring to FIGS. 2 and 3, the annular fuel manifold 22 is internally mounted within the gas generator casing 26 of the engine, adjacent to an upstream or dome end 19 of the combustor 16. The fuel manifold 22 has a main ring body 23 defining at least one fuel flow passage 25 therein and preferably also includes an outer heat shield 27 which at least partially encloses the main ring body 23. The fuel passage 25 of the annular fuel manifold ring 22 is disposed in fuel flow communication with a plurality of fuel injector spray tip assemblies (not shown), which typically project from the fuel manifold into the combustion chamber 17 for injecting fuel and combustion air therein. The fuel manifold 22 includes mounting portions disposed at several points thereabout for mounting the fuel manifold within the surrounding casing 26. The mounting portions are preferably in the form of attachment lugs 24, which are fixed to the main ring body 23 and project, preferably axially, therefrom such as to permit a support element 30 to be displaced therethrough without contacting or fouling on the main ring body 32 of the manifold. The main ring body 23 may also be provided with a recess formed therein in alignment with each attachment lug 24, such that the support element may slide within the lugs as described in more detail below without contacting the main ring body. The surrounding heat shield 27 also preferably includes recesses 33 therein, such that displacement of the support elements 30 remains uninhibited. The recesses 33 in the heat shield 27 are circumferentially aligned with each of the attachment lugs 24. The attachment lugs 24 may be either permanently fastened to the main ring body 23, or alternately may be integrally formed therewith. Each attachment lug 24 define at least one aperture 32 therein for receiving a support element 30 which is fastenable to the gas generator case 26 in order to internally mount the fuel manifold 22 therewithin. The gas generator case 26 is preferably an annular casing defining circumferential inner and outer surfaces 38 and 39 respectively.

The support elements preferably comprise support pins 30, which are slidably displaceable within the apertures 32 of the attachment lugs 24, preferably along a center axis of the apertures 32 which is coaxial with the longitudinal axis 42 of the support pins 30, between at least an inner or retracted position (depicted in FIG. 2 with dotted lines 34) and an outer or extended position (depicted in FIG. 2 with solid lines). When disposed in said retracted position, the fuel manifold with said support pins 30 mounted thereto defines an overall diameter which is sufficiently small to fit within an inner clearance diameter defined between the inner surfaces 39 of the surrounding gas generator casing 26. Thus, the installation and internal mounting of the fuel manifold within the casing is possible without having to insert the support pins from the outside of the casing, as the sub-assembly formed by the annular fuel manifold 22 and the support pins 30 mounted therein in said retracted position, can be inserted directly into the casing for internal mounting therewithin.

Each support pin 30, which includes a radially inner end 31 and a radially outer end 36, therefore radially projects a first distance away from the attachment lugs 24 (and therefore the fuel manifold 22) when disposed in the retracted position and projects a second distance, greater than the first distance, when disposed in the extended position. This accordingly permits a sub-assembly formed by the fuel nozzle and the support pins 30 mounted thereon in the retracted position, to be inserted within the case together. Once located within the casing 26, the support pins 30 can be slid radially outward along their longitudinal axes 42 (i.e. towards the inner surface of the casing) from their retracted position to their extended position, such that the outer ends 36 of the pins 30 can be fastened to the casing 26 from the inner side thereof. More particularly, the casing 26 preferably includes attachment bosses 28 disposed therein at points which correspond to the attachment lugs 24 of the fuel manifold, and which have threaded apertures 40 therethrough. The outer ends 36 of the support pins 30 are correspondingly threaded, such that the pins 30 can be threadably fastened within the apertures 40 of each of the bosses 28 in the casing 26. Thus, so fastened to the surrounding casing 26, the support pins radially project inwards towards the engine centerline 11, in order to retain the annular fuel manifold 22 in place therewithin. Once mounted in place, some radial displacement between the fuel manifold 22 and the support pins 30 remains possible due to the sliding link between the apertures 32 in the attachment lugs 24 and the inner ends 31 of the pins 30. Thus, any relative thermal growth between the fuel manifold and the support pins and casing can be accommodated.

Preferably, the pins 30 are translated outward along their longitudinal axis 42 between the retracted and the extended positions. In order to slide the pins 30 outwardly into the extended positions, an appropriate tool is preferably inserted through the apertures 40 and used to pull the outer ends 36 of the pins 30 outwards from the outer side of the casing 26. The pins 30 can then be rotated in place about their longitudinal axis 42, in order to threadably fasten them within the bosses 28. Wrenching flats 44 may be provided on the body of the support pins 30 in order to permit the pins to be rotated by a suitable tool such as a torque wrench and torqued into place within threaded apertures 40. A washer 48 is disposed about each support pin 30, and is adapted to be squeezed between the projecting portion 43 of the pin 30 having the wrenching flats 44 thereon and the mating inner surface 29 on the casing bosses 28.

When the annular fuel manifold 22 is inserted into the casing 26, this is preferably done by aligning the center of the annular manifold with a main longitudinal axis of the casing 26, which in the present case corresponds to the centerline axis 11 of the gas turbine engine 10. The fuel manifold 22 is then displaced coaxially along this longitudinal center axis until the fuel manifold is located in a predetermined fore-aft position within the casing 26, particularly adjacent the dome end 19 of the combustor 16. The support pins 30 can then be radially outwardly displaced into their extended positions, as described above, for fastening within the casing 26.

Thus, as the fuel manifold 22 is able to be installed and/or removed from the gas generator casing 26 of the gas turbine engine 10 from the inner side thereof, this enables the fuel manifold to be installed or removed from the casing, and therefore from the engine, regardless of any radially external obstructions which may be installed about the outside the casing. For example, once the bypass air duct is installed outside the gas generator casing 26 surrounding the combustor 16, removal or installation of the fuel manifold 22 remains possible due to the internal mounting configuration thereof. This was previously not possible with externally mounted fuel manifolds of the prior art, which necessitated accessing the supporting pins from the outside of the gas generator casing, and therefore required complete removal of the bypass duct in order to do so.

The above description is meant to be exemplary only, and one skilled in the art will recognize that changes may be made to the embodiments described without department from the scope of the invention disclosed. For example, although an annular fuel manifold is described and depicted, a non-annular fuel manifold may also be used. Further, although a number of support pins are preferably provided and equally distributed about the circumference of the fuel manifold, groupings of a number of support pins may also be used, and the distribution of support pins about the fuel nozzle may be unevenly distributed in order to provide additional support to areas predetermined to require additional support and localization within the surrounding gas generator case. Further still, although the support pins are preferably displaced linearly or translated by sliding between their retracted positions and their extended positions, the pins may be alternately displaced between the two positions. For example, the support pins may be hinge or otherwise interconnect with the fuel manifold, and simply pivoted or rotated from retracted position to the extended position. Although support pins have been described as "pins", they need not be pins, per se, but rather any suitable support arrangement extending between manifold and surrounding structure. The manifold supports need not engage the gas turbine case directly. While the embodiments described above generally contemplate supports mounted to the manifold and which extend outwardly to engage the engine case surrounding support structure, the present invention also encompasses an inverse arrangement, wherein supports are mounted to the engine case or other support structure, retract generally outwardly and extend generally inwardly for engagement with the manifold. Still other modifications which fall within the scope of the present invention will be apparent to those skilled in the art, in light of a review of this disclosure, and such modifications are intended to fall within the appended claims.

The invention claimed is:

1. A method of installing a fuel manifold within a casing of a gas turbine engine comprising:
    providing the fuel manifold with attachment members fixed thereto, each of said attachment members defining an aperture for receiving a support element therein;
    mounting said support elements on said fuel manifold in a retracted position within said apertures such that said support elements project a first distance from said fuel manifold, said fuel manifold and said support elements mounted thereto in said retracted position forming a sub-assembly sized for receipt within said casing;
    inserting said sub-assembly into said casing;
    displacing said support elements outwards from the retracted position into an extended position wherein the support elements project from the fuel manifold a second distance greater than said first distance, outer ends of said support elements being disposed proximate an inner surface of said surrounding casing when said support elements are disposed in said extended position; and
    fastening said outer ends of said support elements to said inner surface of said casing.

2. The method as defined in claim 1, wherein said fuel manifold is annular and said attachment members are circumferentially spaced about said fuel manifold, the step of displacing said support elements further comprising sliding said support elements radially outwards from said attachment members.

3. The method as defined in claim 2, wherein the casing is annular and defines a longitudinal center axis therethrough, the step of inserting further comprising aligning a center of said annular fuel manifold with said longitudinal center axis and displacing said sub-assembly co-axially along said longitudinal center axis.

4. The method as defined in claim 1, wherein the step of fastening further comprises threadably fastening said outer ends of said support elements with corresponding threaded openings defined in said casing.

5. The method as defined in claim 1, wherein the support elements are elongated and define longitudinal axes therethrough, the step of displacing further comprising translating said support elements relative to said attachment members along said longitudinal axes thereof.

6. The method as defined in claim 5, wherein the support elements are translated outwards along said longitudinal axes by pulling said support elements from outside said casing via openings defined therein.

7. A method of internally mounting a fuel manifold within a surrounding casing in a gas turbine engine, the gas turbine engine including support elements mounted to at least one of the fuel manifold and the surrounding casing and movable relative thereto between at least a retracted and an extended position while mounted thereto, the method comprising:
    placing the support elements mounted in a retracted position;
    inserting the fuel manifold into the casing; and
    moving said support elements to the extended position to supportingly engage said fuel manifold to said casing by manipulating said support elements from outside said casing via openings defined in said casing.

8. The method as defined in claim 7, with said support elements are mounted to the fuel manifold, and wherein the extended position is radially outward the retracted position relative to the manifold.

9. The method as defined in claim 7, wherein the step of moving said support elements further comprises radially translating said support elements.

10. The method as defined in claim 7, wherein the step of inserting said fuel manifold into said casing further comprises axially translating said fuel manifold along a central longitudinal axis of said casing.

* * * * *